United States Patent Office 3,138,567
Patented June 23, 1964

3,138,567
PRINTING COMPOSITIONS AND TEXTILES
COATED THEREWITH
John R. Abrams, Coytesville, N.J., and Jerome Fine, Oceanside, and Charles J. Lattarulo, New York, N.Y., assignors to Interchemical Corporation, New York, N.Y., a corporation of Ohio
No Drawing. Filed Aug. 16, 1961, Ser. No. 131,735
4 Claims. (Cl. 260—29.4)

This invention relates to novel textile printing compositions and to the decoration of textiles therewith; more particularly it relates to an aqueous textile printing paste comprising a unique combination of dispersing agent and binder system, and to textile webs decorated therewith.

It is old in the art to decorate textiles with printing compositions containing pigments dispersed in aqueous solutions or dispersions of thermoplastic polymers and a crosslinking agent that will react with the polymer to form a binder that binds the pigment to the textile. Most of the prior art crosslinker systems for decorating textiles employ a polyfunctional alkylenimine compound as the crosslinking agent and a water-soluble acrylic resin, e.g. the salt of a polymer or copolymer of acrylic acid, as the thermoplastic polymer that will crosslink with the imine compound.

This invention provides compositions for printing colorants on textiles consisting of coloring matter dispersed in a vehicle comprising a thickened aqueous phase, a special acrylic copolymer having pigment dispersing properties, and a crosslinker capable of crosslinking the copolymer. The thickened aqueous phase has unique properties imparted by water-soluble salts of certain synthetic thickeners. The thickener may be neutralized with various alkaline substances such as alkali metal or ammonium hydroxides, carbonates, borates, or their salts with weak acids such as formic, acetic, propionic, etc. Also suitable are various amines such as triethylamine, monoamylamine, triamylamine, di-2-ethylhexylamine, dodecylamine, etc., or various alkanolamines such as monoethanolamine, diisopropanolamine, triethanolamine. Although the choice is not critical, ammonium hydroxide is preferred.

The printing composition is compounded by combining the color concentrate, the latex, and the "clear". The concentrate contains the color, dispersing agent, and thickener, adjusted to a pH of about 8. It was found that a substantial proportion of water-soluble, thermosetting acrylic binders and pigment disperants comprising copolymers of a major proportion of ethyl acrylate and lesser amounts of lauryl methacrylate and acrylamide, and methacrylic acid, when methylolated was a valuable component for the color concentrate if a suitable crosslinking agent was present in minor amounts. Trisaziridinyl phosphine oxides and the hexamethyl ether of hexamethylol melamine are the preferred crosslinkers. The small quantity of thickener present is preferably the substance having the trade name "DX–840–73," which is the partially crosslinked copolymer of ethylene and maleic anhydride and has a viscosity of 40,000 cps. at 25° C. as a 1% solution in dimethyl formamide. Such compounds are described in greater detail in U.S. Patent No. 2,921,928. The thickener in the color concentrate is there primarily to keep the pigment in suspension and so prevent it from settling out after prolonged standing.

Standard latices may be used for the binder, choice being made with an eye to the qualities desired. We prefer a low-crock type that will also impart a good hand to the finished fabric.

The clear is used as a vehicle for the color concentrate and binder. It serves to dilute the color to the desired degree. Crosslinking agents are sometimes incorporated into the clears of textile printing systems to improve the fastness. The novel clears of the instant invention do not contain such adjuvants. A great many thickeners were tried and had to be discarded because all showed unsatisfactory color, often flocculated, and none had the proper flow and viscosity characteristics. Surprisingly, it was found that the substance having the trade name "DX–840–91," which is the partially crosslinked copolymer of ethylene and maleic anhydride having a viscosity of 160,000 cps. at 25° C., could be made up into clears having practically constant viscosity and good flow properties when blended with various amounts of color concentrate ranging from small amounts to relatively large ones. By adjusting the pH of a 1.5% aqueous solution of this substance to a value of 8 with 1–3% ammonium carbonate, the viscosity was brought to 10,000 cps., as measured with a Brookfield viscometer. Flow was also good and these favorable properties were retained at moderate changes in concentration of the thickener thus treated with ammonium carbonate. As the concentration was increased, color quality improved, but the economics became unfavorable. It may be considered that concentrations over about 3% by weight are not of commercial interest. Below a concentration of 1.5% thickener, color yield deteriorated. A concentration of 1.5% is preferred. Whether the pigment content was low or relatively high, the cuts had a constant viscosity and good flow properties. Concentrations of organic pigments ranging from .001% to 4% by weight of the blend showed no appreciable change in this respect; all had a viscosity of 10,000 cps. as measured with a Brookfield viscometer on a 1.5% aqueous solution at 25° C.

The use of ammonium carbonate as a viscosity control agent, however, posed various problems, particularly in commercial techniques, due to foam. It was found that this drawback could be overcome by using ammonium acetate in combination with ammonium hydroxide to adjust the hydrogen ion concentration. Both diammonium phosphate and ammonium nitrate were also effective at comparatively high concentrations, but were considered less desirable because they had a tendency to "tender" cloth. Ammonium bicarbonate was operative, but also gave some trouble with foaming. Alkali metal chlorides may be used but the cure is not so good unless there is also present a small proportion of an acid-generating material such as diammonium phosphate or ammonium nitrate, the acid generators being present in such small amounts that they have no deleterious effect on the cloth. The only equivalent of "DX–840–91" in this application was found to be "Carbopol 934," a trade name for a copolymer of 100 parts acrylic acid and about 1 to 2 parts of octa-allyl sucrose.

In the examples parts are parts by weight on the wet basis unless otherwise stated.

COLOR CONCENTRATES

*Example 1.—Blue*

| | |
|---|---|
| Phthalocyanine blue pulp (25.4%) | 51.2 |
| Compound of Example 8 (30.9% solids) | 15.9 |
| Duponol ME (sodium lauryl sulfonate) | 0.7 |
| Antifoam B (25.0%) | 1.0 |
| DX–840–73 | 1.0 |
| Ammonium hydroxide (26%) | 1.0 |
| Water | 29.0 |
| | 100.0 |

The ingredients were weighed, mixed in a high speed mixer, and then run through a colloid mill.

The other color concentrates were treated similarly.

Example 2.—Red

| | |
|---|---|
| Permanent Carmine FR dispersed pulp* | 53.0 |
| Compound of Example 8 (30.9% solids) | 14.9 |
| Duponol ME | 0.6 |
| Antifoam B (25%) | 1.0 |
| DX–840–73 | 1.0 |
| Ammonium hydroxide (26%) | 1.0 |
| Water | 29.1 |
| | 100.0 | pH was 9.0.

*Prototype of Colour Index No. 398.

Example 3.—Green

| | |
|---|---|
| Phthalocyanine Green (41.0%) | 39.0 |
| Compound of Example 8 (30.9% solids) | 19.9 |
| Duponol ME | 0.9 |
| Antifoam B (25%) | 1.3 |
| DX–840–73 | 1.3 |
| Ammonium hydroxide (25%) | 1.3 |
| Water | 36.3 |
| | 100.0 |

1 to 3% of crosslinker may be added to the compositions in these 3 examples. Duponol ME and Antifoam B (25%) are not necessary, but Duponol ME brightens the color somewhat and it is helpful to use the antifoaming agent with Duponol ME.

The binder can be standard types of butadiene-acrylonitrile carboxyl-containing latices. A low-crock variety is preferred, for instance "Tylac LF–1204c" or "Hycar 1571."

Clears—Example 4

| | |
|---|---|
| "DX–840–91" (or "Carbopol 934") | 1.5 |
| Ammonium carbonate (26%) | 10.0 |
| Water | 88.5 |

The ingredients were mixed with a high-speed mixer, as were the clears in the subsequent examples.

Example 5

| | |
|---|---|
| "DX–840–91" (or "Carbopol 934") | 1.5 |
| Ammonium hydroxide (26%) | 2.0 |
| Ammonium acetate (50%) | 3.0 |
| Water | 93.5 | pH was 8.0–8.5.

Example 6

| | |
|---|---|
| "DX–840–91" (or "Carbopol 934") | 1.5 |
| Ammonium hydroxide (26%) ml | 2.0 |
| Diammonium phosphate (35%) ml | 4.3 |
| Water ml | 92.2 |

Example 7

| | |
|---|---|
| "DX–840–91" (or "Carbopol 934") | 1.5 |
| Ammonium hydroxide (26%) ml | 2.0 |
| Ammonium nitrate (50%) ml | 3.0 |
| Water ml | 93.5 |

In the clears part of the water (up to about 3.5%) may be replaced by a hydrocarbon, thus giving somewhat improved brightness to the color, particularly in short "cuts." The hydrocarbon may have a boiling range in the region of about 150° C. to about 225° C., a kauri-butanol value of about 40–98, and an aniline cloud point of about 15–45. The solvents having the trade names "Varsol #2" and "Solvesso 100" are examples of suitable ones. In compounding such clears, the hydrocarbon is conveniently pasted up with the thickener before the water is added. In the range 1.5% to 3.5% by weight on the wet basis, improvement in color is noticeable. Less than 1.5% has no appreciable effect and more than 3.5% shows no further improvement, on the contrary, increasing the amount of hydrocarbon tends to re-introduce the disadvantages of solvent bearing systems.

Example 8.—Binder and Pigment Dispersant 125 parts of isopropanol were heated to reflux (82° C.). Then over a period of 1 hour was added a mixture of 28.2 parts acrylamide, 130.0 parts ethyl acrylate, 20.0 parts lauryl acrylate, 10.0 parts methacrylic acid, 75.0 parts isopropanol, 1.5 parts benzoyl peroxide, and 0.8 parts of tertiary-dodecyl mercaptan, the reflux temperature of 82–83° C. being maintained. Refluxing was continued 2 hours more. 1.5 parts benzoyl peroxide were added. This batch was refluxed another hour, cooled, and the solvent vacuum distilled off at room temperature at 4–5 mm. of mercury. A solution of 64 parts of 37% formalin in 300 parts of water and 41 parts of 29% aqueous ammonium hydroxide was added to the resin and the mixture brought slowly up to 70° C. It was heated 4 hours more at 70–72° C. Solids content was 30.9%.

Other proportions may be used, for instance 60–70 parts of ethyl acrylate, 5–20 parts lauryl methacrylate, 5–20 parts methacrylic acid, and 10–20 parts acrylamide. Instead of acrylamide, N-methylolacrylamide or N,N-diallyl melamine or similar compositions with similar properties would also be suitable.

Example 9

To cut the blue concentrate, suitable mixtures are

| | 4% | 2% | 0.25% |
|---|---|---|---|
| Color concentrate (13.0% pigment) | 30.8 | 15.4 | 2.0 |
| Latex ("Tylac LF–1204c", 40%) | 15.0 | 10.0 | 5.0 |
| Clear of Example 5 | 54.0 | 74.4 | 93.0 |
| FD 82-Antifoam (30% emulsion) | 0.2 | 0.2 | |

Similar mixtures may be made for other color concentrates.

Hycar 1571 and Tylac LF–1204c are butadieneacrylonitrile reactive type latices containing a small amount of carboxyl groups.

Duponol ME is sodium lauryl sulfate.

Antifoam B (25%) is a dispersion in water of 25% of a silicone antifoaming agent.

Antifoam FD 82 is a methyl polysiloxane emulsion, 30% active.

Textiles printed in conventional ways with the compositions of this invention had color, washfastness, solvent resistance, and hand as good as those printed with the aqueous emulsion systems, which have an organic solvent content ranging from 20 to 70%. In light shades the color was markedly superior to such shades produced with the aqueous emulsion systems.

What is claimed is:

1. An aqueous textile-printing composition consisting of coloring matter dispersed in a vehicle comprising (1) a thickened aqueous phase the thickening agent being selected from the group consisting of (a) a water-soluble salt of the copolymer of 100 parts acrylic acid with 1 to 2 parts of octaallyl sucrose and (b) a water-soluble salt of the patrially crosslinked copolymers of ethylene and maleic anhydride having viscosities of 40,000–160,000 centipoises at 25° C. when measured in a 1% by weight solution in dimethyl formamide, (2) a butadiene-acrylonitrile latex binder in which the polymer contains a small amount of carboxylic acid groups, (3) a reactive dispersant comprising a methylolated copolymer of a major proportion of ethyl acrylate, a lesser portion of lauryl methacrylate, a lesser portion of acrylamide, and a minor amount of methacrylic acid, (4) a cross-linking agent selected from the group consisting of tris-aziridinyl phosphine oxides and the hexamethyl ether of hexamethylol melamine, (5) a viscosity control agent selected from the group consisting of ammonium carbonate, ammonium bicarbonate, a mixture of an alkali metal chloride with diammonium phosphate, a mixture of an alkali metal chloride with ammonium nitrate, a mixture of ammonium acetate with ammonium hydroxide, a mixture of diammonium phosphate with ammonium hydroxide, and a mixture of ammonium nitrate with ammonium hydroxide, and (6) a major proportion of water.

2. The composition of claim 1 further characterized by the presence of 1.5 to 3.5% by weight of a hydrocarbon solvent boiling in the range 150° C. to 225° C., having a kauributanol value in the range 40–98, and having an aniline cloud point in the range 15–45.

3. A textile web having on its surface a film comprised of the cured composition of claim 1.

4. A textile web having on its surface a film comprised of the cured composition of claim 2.

References Cited in the file of this patent
UNITED STATES PATENTS

| | | |
|---|---|---|
| 2,274,544 | Gubelmann | Feb. 24, 1942 |
| 2,376,319 | Cassel | May 15, 1945 |
| 2,921,928 | Fields et al. | Jan. 19, 1960 |
| 2,971,815 | Bullock et al. | Feb. 14, 1961 |
| 2,994,676 | Kucsan et al. | Aug. 1, 1961 |
| 3,023,177 | Boucher | Feb. 27, 1962 |